Figure 1:
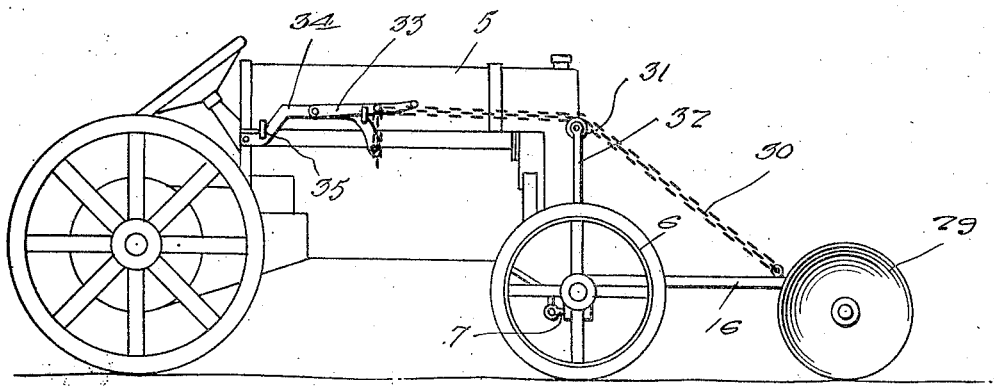

Aug. 24, 1926.

B. C. FIEDLER ET AL 1,597,519

TRACTOR GUIDE

Filed Jan. 22, 1926

Inventors
B. C. Fiedler
L. H. Fiedler

By Clarence A. O'Brien

Attorney

Patented Aug. 24, 1926.

1,597,519

UNITED STATES PATENT OFFICE.

BENJAMIN C. FIEDLER AND LINCOLN H. FIEDLER, OF ENTERPRISE, KANSAS.

TRACTOR GUIDE.

Application filed January 22, 1926. Serial No. 83,039.

The present invention relates to an attachment for a tractor wherein the attachment is provided with a furrow disk supported on means for guiding the dirigible wheels of the tractor so as to maintain the tractor in a path concentric with the furrow in which the disk is moving.

The invention also has for its object to provide a guiding structure of this nature which is adjustable in numerous different ways and which may be raised to an inactive position.

The above objects are carried out by an exceedingly simple construction which is inexpensive to manufacture, one which is strong and durable, reliable and efficient in operation, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
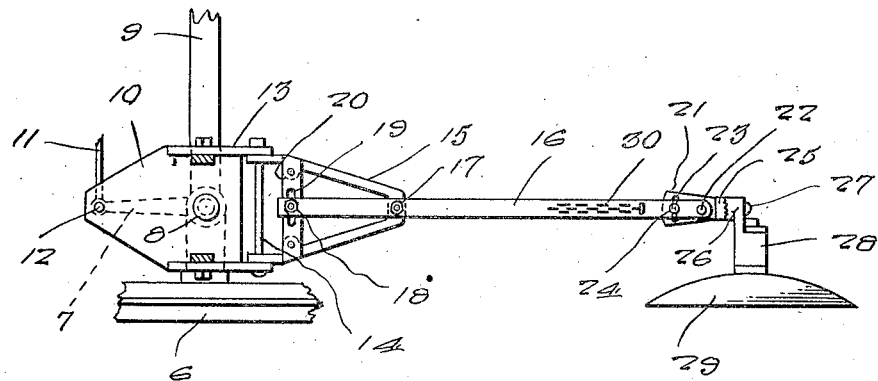

Figure 1 is a side elevation of a tractor with my guiding apparatus associated therewith, and Figure 2 is a plan view of the apparatus.

Referring to the drawing in detail, it will be seen that 5 designates generally a tractor of a well known type having the dirigible front wheels 6 mounted on steering knuckles 7 in the usual manner. The pin 8 which mounts each steering knuckle on the front axle 9 is slightly longer than usual so as to also mount a casting 10. The numeral 11 designates the connecting rod and the numeral 12 the pin engaging the connecting rod with the arm of the steering knuckle. This pin is extended through the casting 10 so that by swinging the casting on the pin 8 the dirigible wheel will be swung in unison therewith. Arms 13 project forwardly from the castings and receive the hinge pin 14 on which is swingably mounted the frame 15. A bar 16 is pivoted intermediate its ends to the forward end of the frame 15 as at 17. A bolt 18 passes through the rear extremity of the bar and through a slot 19 provided in a cross bar 20 on the frame 15 so that the bar 16 may be held in different angular positions in relation to the castings and the tractor. A plate 21 is pivotally mounted as at 22 on the extremity of the forward portion of the bar 16 and has an arcuate slot 23 in the rear portion thereof for receiving a bolt 24 passing through the forward part of the bar 16. The front end of the plate 21 terminates in a serrated head 25 which may be placed at different angular positions in relation to the bar 16 by the adjustment formed by plate 21 with the slot 23 and the bolt 24. A serrated block 26 is swingably mounted on a bolt 27 engageable with the head 25 so that said block may be held in different angular relationships to the head 25. The offset extensions 28 is provided on the block 26 and has rotatably mounted thereon a furrow disk 29 of the concave or convex type, the concave side of which is disposed adjacent the bar 16.

This furrow disk 29 and the associated parts are mounted to the right of the tractor. A chain 30 is engaged with the forward portion of the bar 16 and is trained over a pulley 31 carried at the upper end of the standards 32 rising from the casting 10. The other end of this chain is engaged with a lever 33 pivoted on the bracket 34 having stops 35 at its extremity. When the lever is in the forwardly extending position as shown in Figure 1 the furrow disk is in a lowered position but if this lever is swung to a rearwardly extending position it will be seen that the chain will be pulled to lift the furrow disk 29 by swinging the bar 16 and frame 15 in relation to the casting 10.

It will be apparent from the above that as the tractor progresses along with the furrow disk 29 in a furrow that said tractor will be automatically guided to follow a path concentric with the furrow.

It is thought that the construction, operation, utility, and advantages of this invention will now be clearly understood without a more detailed description thereof. The present embodiment of the invention has been disclosed in detail since in actual practice it attains the features of advantage enumerated as desirable in the statement of the invention and the above description.

It will be apparent that numerous changes in the details of construction and in the combination and arrangement of parts may be resorted to without departing from the spirit or scope of the invention hereinafter claimed or sacrificing any of its advantages.

Having described my invention what I claim as new is:—

An attachment of the class described including a casting adapted to be rigidly mounted on the steering knuckle of a tractor, a frame hingedly engaged on the casting, a bar pivotally engaged on the frame, means for holding the bar in different angular positions in relation to the frame, a block adjustably mounted on the bar, a furrow disk journaled on the block, a pair of standards rising from the casting, a pulley mounted between the upper ends of the standards, and a chain trained over said pulley and having one end engaged with said bar.

In testimony whereof we affix our signatures.

BENJAMIN C. FIEDLER.
LINCOLN H. FIEDLER.